G. B. JENKINSON.

Assignor to G. M. BALLARD & G. MINCHIN.

Trunk-Caster-Frame.

No. 8,180. Reissued April 16, 1878.

Attest:

Oliver Drake

P. J. Inslee

Inventor.

Geo B Jenkinson

N. PETERS, PHOTO-LITHOGRAPHER, WASHINGTON, D. C.

UNITED STATES PATENT OFFICE.

GEORGE B. JENKINSON, OF NEWARK, NEW JERSEY, ASSIGNOR TO GEORGE M. BALLARD AND GEORGE MINCHIN.

IMPROVEMENT IN TRUNK-CASTER FRAMES.

Specification forming part of Letters Patent No. 80,548, dated August 4, 1868; Reissue No. 8,180, dated April 16, 1878; application filed December 19, 1877.

*To all whom it may concern:*

Be it known that I, GEORGE B. JENKINSON, of Newark, New Jersey, have invented an Improved Trunk-Caster Frame, of which the following is a description, reference being had to the accompanying drawing and letters of reference thereon, which form a part of this specification.

My invention is a trunk-caster frame constructed, as fully described hereinafter, so as to fully protect and prevent the splitting of the cleat, the end of which is cut away to receive the roller and its bearings.

Figure 1:
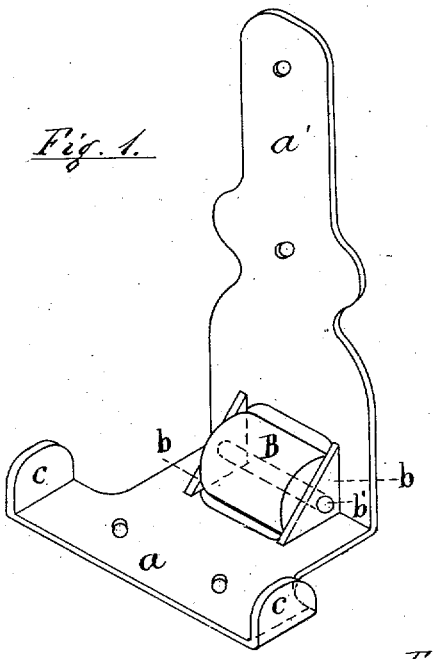
Figure 2:
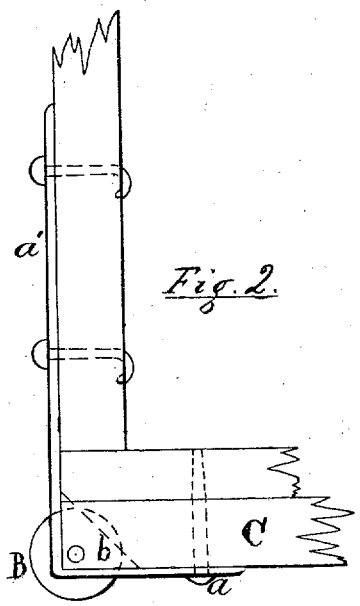
Figure 3:
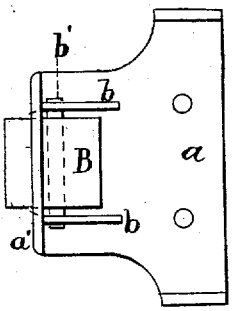

In the drawing, which forms a part of this specification, Figure 1 is a perspective view of my improved frame; Fig. 2, a side view, showing the same as applied to a trunk; Fig. 3, a plan view.

The caster-frame, of brass, malleable iron, or sheet metal, consists of the arms *a a′*, at right angles to each other, with a corner opening to receive the roller B, and diagonal braces *b b*, at opposite edges of said opening, to support the pin *b′* on which the roller turns.

The cleat C is cut away to receive the roller and its bearings, so that the end of the cleat at each side fits within the angle between the arms *a a′* outside of the braces *b b* and opposite the ends of the pin *b′*, which is thereby prevented from moving laterally out of place. As the cutting away of the cleat weakens the same, the arm *a* is provided with ears *c c*, which extend upward opposite the side edges of the cleat, and prevent it from splitting.

I claim—

1. A caster-frame carrying the roller B, and provided with ears *c c* for clasping the sides of the cleat, as set forth.

2. The combination of the frame, its clamping-ears *c c*, and braces *b b*, arranged on opposite sides of the roller-opening, and supporting the roller-pin, and the cleat recessed to receive the roller and bearings, all as set forth.

In testimony that I claim the foregoing I hereto affix my signature in presence of two witnesses.

GEO. B. JENKINSON.

Witnesses:

OLIVER DRAKE,

P. J. INSLEE.